US012763932B2

(12) United States Patent
Valkaitis

(10) Patent No.: US 12,763,932 B2
(45) **Date of Patent: *Oct. 13, 2026**

(54) ORGANIZED DATA STORAGE SYSTEM

(71) Applicant: UAB 360 IT, Vilnius (LT)

(72) Inventor: Mindaugas Valkaitis, Vilnius (LT)

(73) Assignee: 720 IT, UAB, Vilnius (LT)

( * ) Notice: Subject to any disclaimer, the term of this patent is extended or adjusted under 35 U.S.C. 154(b) by 127 days.

This patent is subject to a terminal disclaimer.

(21) Appl. No.: 18/957,630

(22) Filed: Nov. 22, 2024

(65) Prior Publication Data

US 2025/0088350 A1 Mar. 13, 2025

Related U.S. Application Data

(63) Continuation of application No. 18/407,834, filed on Jan. 9, 2024, now Pat. No. 12,192,335, which is a (Continued)

(51) Int. Cl.
*H04L 9/08* (2006.01)
*G06F 3/06* (2006.01)
(Continued)

(52) U.S. Cl.
CPC .......... *H04L 9/0825* (2013.01); *G06F 3/0622* (2013.01); *G06F 3/0655* (2013.01);
(Continued)

(58) Field of Classification Search
CPC ..... H04L 9/0825; H04L 9/0822; H04L 9/085; H04L 9/0866; H04L 9/088; H04L 9/14;
(Continued)

(56) References Cited

U.S. PATENT DOCUMENTS 5,652,795 A 7/1997 Dillon et al.
6,760,752 B1 7/2004 Liu et al.
(Continued)

FOREIGN PATENT DOCUMENTS

CA 2887111 A1 4/2014
WO 2001052473 A1 7/2001

OTHER PUBLICATIONS

"Private key group share access encrypt public key—Google Scholar," printed Nov. 20, 2021, from the Internet at https://scholar.google.com/scholar?hl=en&as_sdt=0%2C5&q=Private+key+group+share+access+encrypt+public+key&btnG=, 2 pages.
(Continued)

*Primary Examiner* — Theodore C Parsons
*Assistant Examiner* — Howard H. Louie
(74) *Attorney, Agent, or Firm* — The Pattani Law Group

(57) ABSTRACT

The present disclosure discloses configuring a device to determine an assigned public key and an assigned private key; configuring the device to determine a content access public key and a content access private key; configuring the device to determine, for a folder, a folder access public key and a folder access private key; configuring the device to encrypt the content access private key by utilizing the assigned public key; configuring the device to encrypt the content access private key by utilizing the folder access public key; configuring the device to transmit the encrypted content, the first encrypted content access private key, and the second encrypted content access private key to a server for storage; and configuring the device to access, from the server, the encrypted content by decrypting the first encrypted content access private key or by decrypting the second encrypted content access private key. Various other aspects are contemplated.

20 Claims, 10 Drawing Sheets

Related U.S. Application Data continuation of application No. 17/492,662, filed on Oct. 3, 2021, now Pat. No. 11,930,102, which is a continuation of application No. 17/483,754, filed on Sep. 23, 2021, now Pat. No. 11,646,874.

(51) Int. Cl.

| | |
|---|---|
| ***G06F 21/62*** | (2013.01) |
| ***H04L 9/14*** | (2006.01) |
| ***H04L 9/30*** | (2006.01) |
| ***H04L 67/06*** | (2022.01) |
| ***H04L 67/1097*** | (2022.01) |

(52) U.S. Cl.

CPC ........ *G06F 3/0679* (2013.01); *G06F 21/6209* (2013.01); *H04L 9/0822* (2013.01); *H04L 9/085* (2013.01); *H04L 9/0866* (2013.01); *H04L 9/088* (2013.01); *H04L 9/14* (2013.01); *H04L 9/30* (2013.01); *H04L 67/06* (2013.01); *H04L 67/1097* (2013.01)

(58) Field of Classification Search

CPC ....... H04L 9/30; H04L 67/06; H04L 67/1097; H04L 9/08; G06F 3/0622; G06F 3/0655; G06F 3/0679; G06F 21/6209; G06F 21/62; G06F 3/06

See application file for complete search history.

(56) References Cited

U.S. PATENT DOCUMENTS

| | | | |
|---|---|---|---|
| 6,789,195 | B1 | 9/2004 | Prihoda et al. |
| 7,178,021 | B1 | 2/2007 | Hanna et al. |
| 9,397,984 | B1 | 7/2016 | Hu |
| 9,673,975 | B1 | 6/2017 | Machani |
| 11,003,791 | B2 | 5/2021 | Wang et al. |
| 11,057,189 | B2 | 7/2021 | Wei et al. |
| 11,121,877 | B2 | 9/2021 | Guillama et al. |
| 11,146,560 | B1 | 10/2021 | Nene |
| 11,212,347 | B2 | 12/2021 | Zakrzewski et al. |
| 11,251,963 | B2 | 2/2022 | Wei et al. |
| 11,252,166 | B2 | 2/2022 | Wei et al. |
| 11,310,051 | B2 | 4/2022 | Wei et al. |
| 11,316,685 | B1 | 4/2022 | Doherty et al. |
| 11,363,009 | B2 | 6/2022 | Guccione et al. |
| 2004/0123104 | A1 | 6/2004 | Boyen et al. |
| 2005/0044356 | A1 | 2/2005 | Srivastava et al. |
| 2006/0010323 | A1 | 1/2006 | Martin et al. |
| 2006/0010324 | A1 | 1/2006 | Appenzeller et al. |
| 2006/0104442 | A1 | 5/2006 | Han et al. |
| 2006/0190715 | A1 | 8/2006 | Miller |
| 2007/0180307 | A1 | 8/2007 | Zohar et al. |
| 2009/0037727 | A1 | 2/2009 | Pritikin |
| 2010/0325732 | A1 | 12/2010 | Mittal et al. |
| 2011/0296172 | A1 | 12/2011 | Fu et al. |
| 2012/0311317 | A1 | 12/2012 | Elrod et al. |
| 2013/0117567 | A1 | 5/2013 | Chang et al. |
| 2013/0254536 | A1* | 9/2013 | Glover ................ G06F 21/6209 713/165 |
| 2014/0115327 | A1 | 4/2014 | Gorbach et al. |
| 2014/0281520 | A1 | 9/2014 | Selgas et al. |
| 2014/0355757 | A1 | 12/2014 | Shrivastava et al. |
| 2015/0143107 | A1 | 5/2015 | Kale et al. |
| 2015/0180839 | A1 | 6/2015 | Moffat |
| 2015/0261972 | A1* | 9/2015 | Lee ......................... H04L 9/088 713/165 |
| 2016/0087967 | A1 | 3/2016 | Pang et al. |
| 2016/0294783 | A1 | 10/2016 | Jover et al. |
| 2017/0331627 | A1 | 11/2017 | Harp |
| 2017/0357822 | A1 | 12/2017 | Wei et al. |
| 2017/0359318 | A1 | 12/2017 | Wei et al. |
| 2018/0012032 | A1 | 1/2018 | Radich et al. |
| 2018/0152454 | A1 | 5/2018 | Kwon et al. |
| 2018/0183777 | A1 | 6/2018 | Guillory et al. |
| 2019/0280858 | A1* | 9/2019 | Cambou ............... H04L 9/3278 |
| 2019/0354693 | A1 | 11/2019 | Yoon et al. |
| 2020/0214106 | A1 | 7/2020 | Huang et al. |
| 2020/0382954 | A1 | 12/2020 | Chazot et al. |
| 2021/0027297 | A1 | 1/2021 | Wall et al. |
| 2021/0167949 | A1 | 6/2021 | Weiss et al. |
| 2022/0245722 | A1 | 8/2022 | Enkhtaivan |
| 2023/0096914 | A1 | 3/2023 | Valkaitis |
| 2023/0098739 | A1 | 3/2023 | Valkaitis |
| 2023/0101213 | A1 | 3/2023 | Trivedi |
| 2023/0101443 | A1 | 3/2023 | Valkaitis |

OTHER PUBLICATIONS

"Private key group share access encrypt public key—InnovationQ Plus", printed Nov. 20, 2021, from the Internet at https://iq.ip.com/discover, 1 page.

Kaliski et al. PKCS #5: Password-Based Cryptography Specification Version 2.0, Sep. 2000, p. 8, https://www.ietf.org/rfc/ rfc2898.txt (Year: 2000).

* cited by examiner

ORGANIZED DATA STORAGE SYSTEM

CROSS REFERENCE

This application is a continuation of U.S. Non-Provisional patent application Ser. No. 18/407,834, filed on Jan. 9, 2024, and titled "Organized Data Storage System," which is a continuation of U.S. Non-Provisional patent application Ser. No. 17/492,662, filed on Oct. 3, 2021, and titled "Organized Data Storage System," which is a continuation of U.S. Non-Provisional patent application Ser. No. 17/483,754, filed on Sep. 23, 2021, and titled "Organized Data Storage System," the entire contents of which applications are incorporated herein by reference.

FIELD OF DISCLOSURE

Aspects of the present disclosure generally relate to use of computer hardware and/or software to manage data, and in particular to providing an organized data storage system.

BACKGROUND

Various methods of cryptography (e.g., encrypting and decrypting data) are known. Encryption may be associated with changing the data from being in a transparently readable format to being in an encoded, unreadable format with the help of an encryption algorithm. Decryption may be associated with changing the data from being in the encoded, unreadable format to being in the transparently readable format with the help of a decryption algorithm. Encoded/encrypted data may be decoded/decrypted with a given decryption key. In an example, symmetric cryptography may utilize encryption and decryption algorithms that rely on a single private key for encryption and decryption of data. Symmetric cryptography is considered to be relatively speedy. One example of an encryption and decryption algorithm utilized by symmetric encryption may be an AES encryption cipher. On the other hand, asymmetric cryptography may utilize encryption and decryption algorithms that rely on two separate but mathematically-related keys for encryption and decryption of data. For instance, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

SUMMARY

In one aspect, the present disclosure contemplates a method including determining, by a device, an assigned key pair including an assigned public key and an assigned private key; determining, by the device for a folder including encrypted content, a folder access key pair including a folder access public key and a folder access private key; encrypting, by the device, the folder access private key by utilizing the assigned public key; and accessing, by the device, the encrypted content based at least in part on decrypting the folder access private key by utilizing the assigned private key.

In another aspect, the present disclosure contemplates a device comprising a memory and a processor communicatively coupled to the memory, the processor being configured to: determine an assigned key pair including an assigned public key and an assigned private key; determine, for a folder including encrypted content, a folder access key pair including a folder access public key and a folder access private key; encrypt the folder access private key by utilizing the assigned public key; and access the encrypted content based at least in part on decrypting the folder access private key by utilizing the assigned private key.

In another aspect, the present disclosure contemplates a non-transitory computer readable medium storing instructions, which when executed by a processor cause the processor to: determine an assigned key pair including an assigned public key and an assigned private key; determine, for a folder including encrypted content, a folder access key pair including a folder access public key and a folder access private key; encrypt the folder access private key by utilizing the assigned public key; and access the encrypted content based at least in part on decrypting the folder access private key by utilizing the assigned private key.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
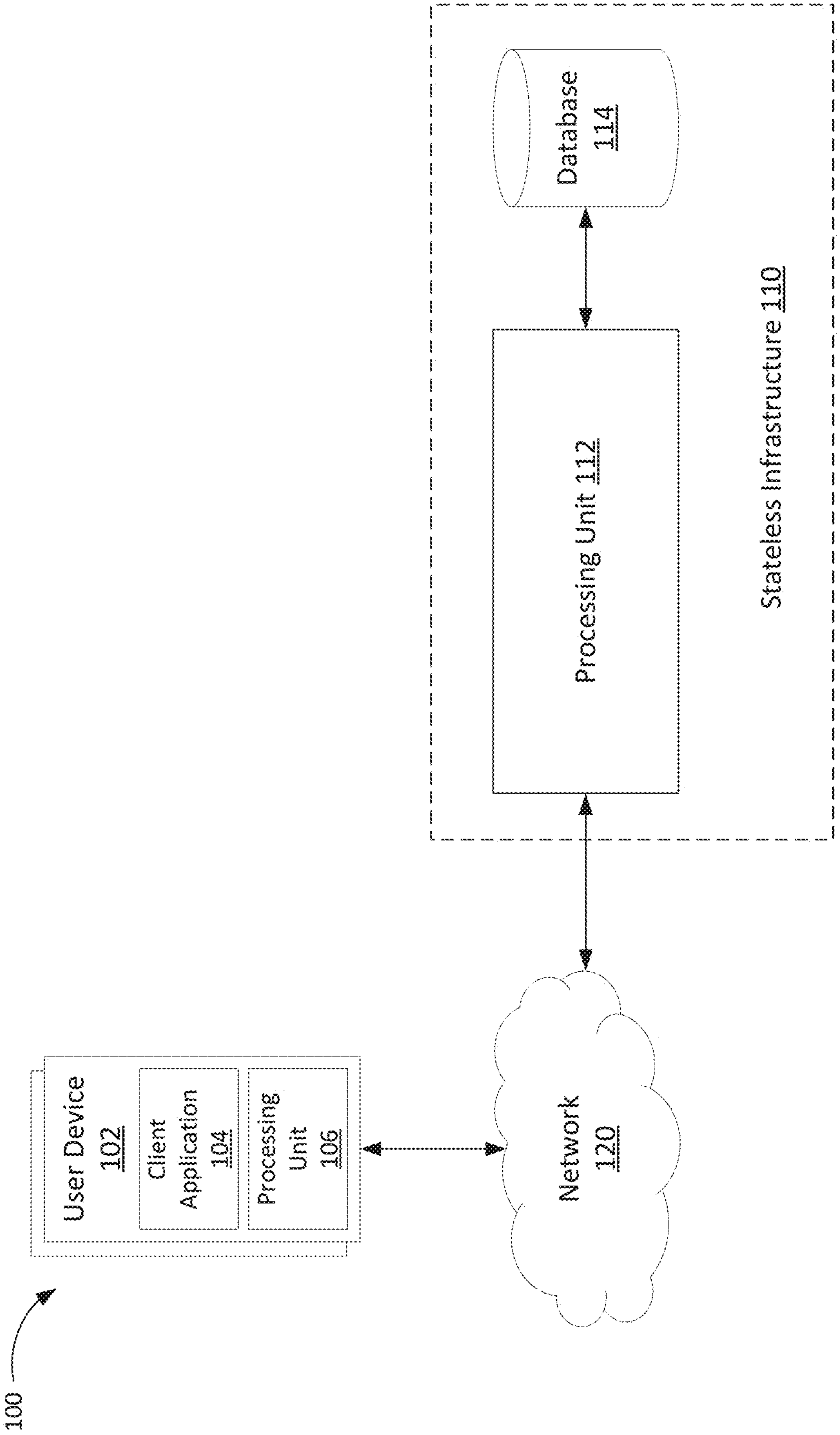

FIG. 1 is an illustration of an example system associated with providing an organized data storage system, according to various aspects of the present disclosure.

Figure 2:
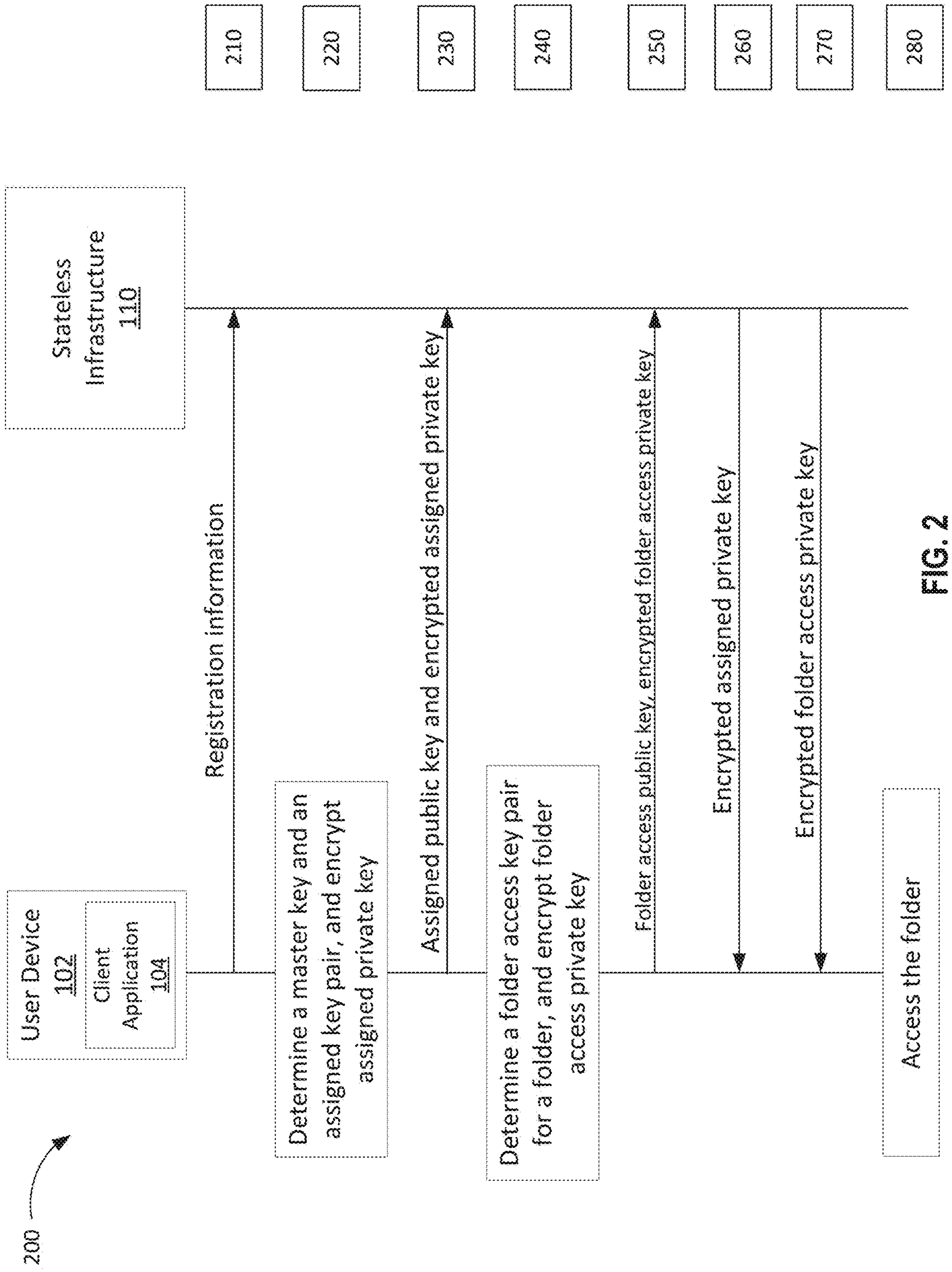

FIG. 2 is an illustration of an example flow associated with providing an organized data storage system, according to various aspects of the present disclosure.

Figure 3:
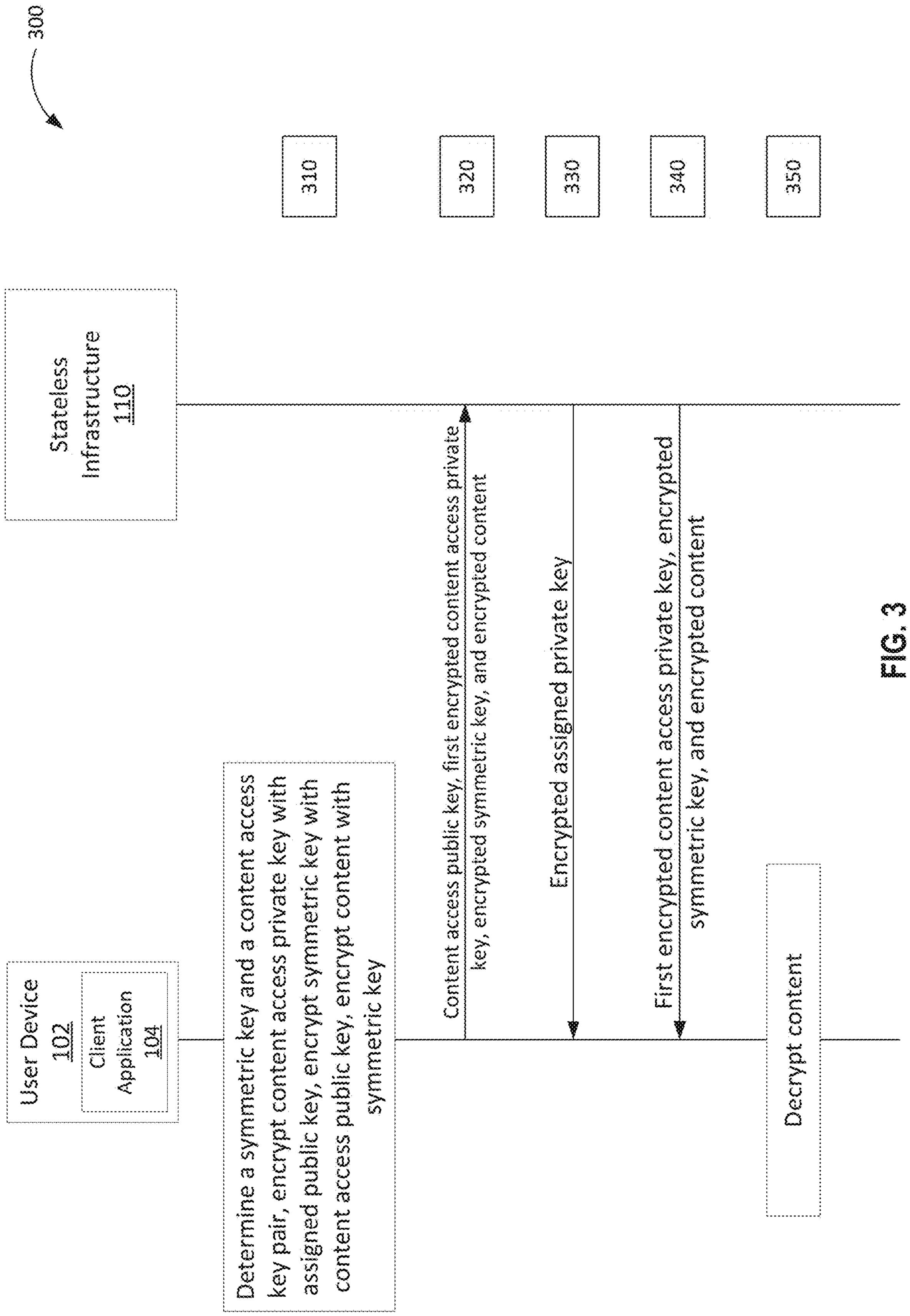

FIG. 3 is an illustration of an example flow associated with providing an organized data storage system, according to various aspects of the present disclosure.

Figure 4:
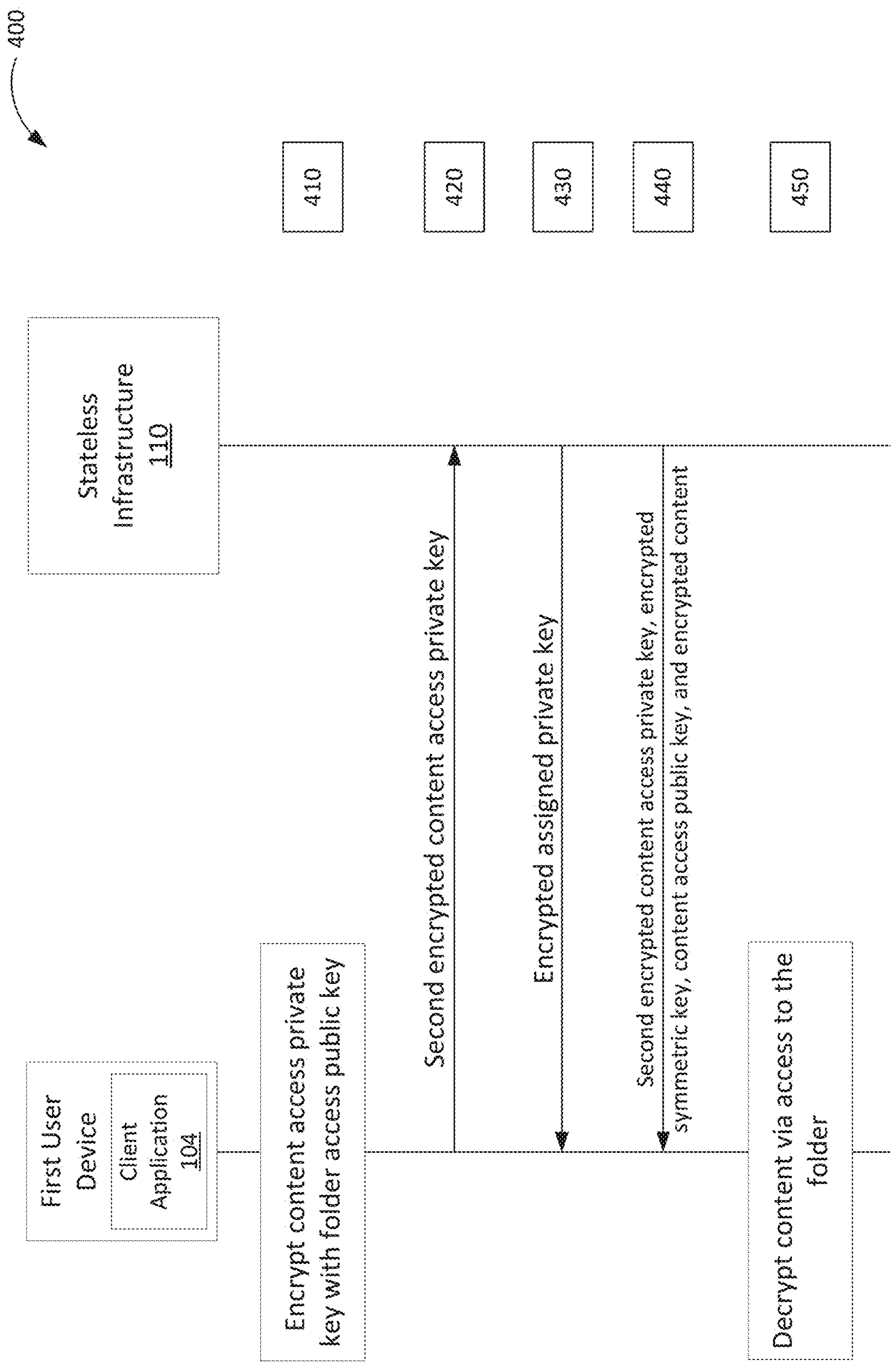

FIG. 4 is an illustration of an example flow associated with providing an organized data storage system, according to various aspects of the present disclosure.

Figure 5:
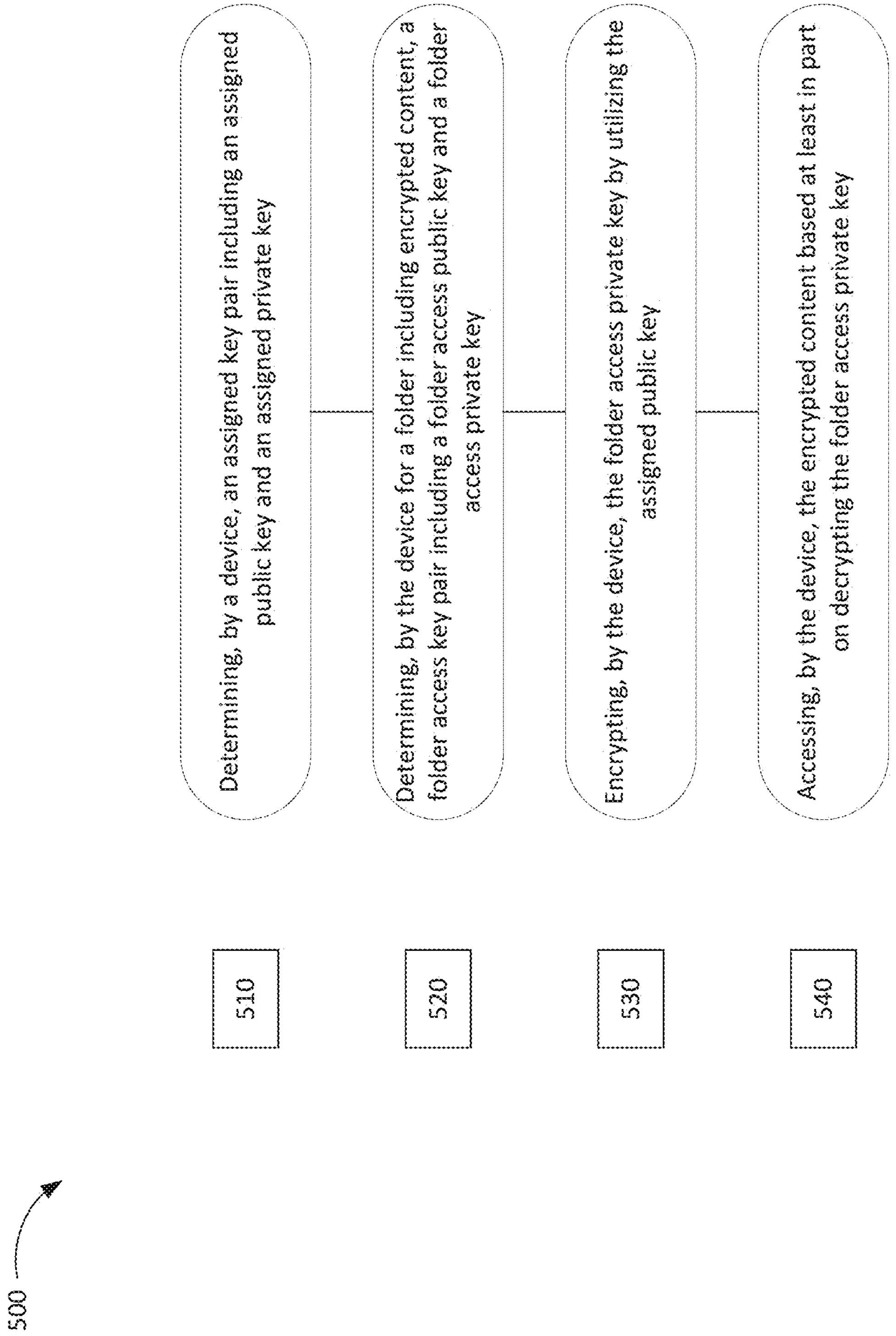

FIG. 5 is an illustration of an example process associated with providing an organized data storage system, according to various aspects of the present disclosure.

Figure 6:
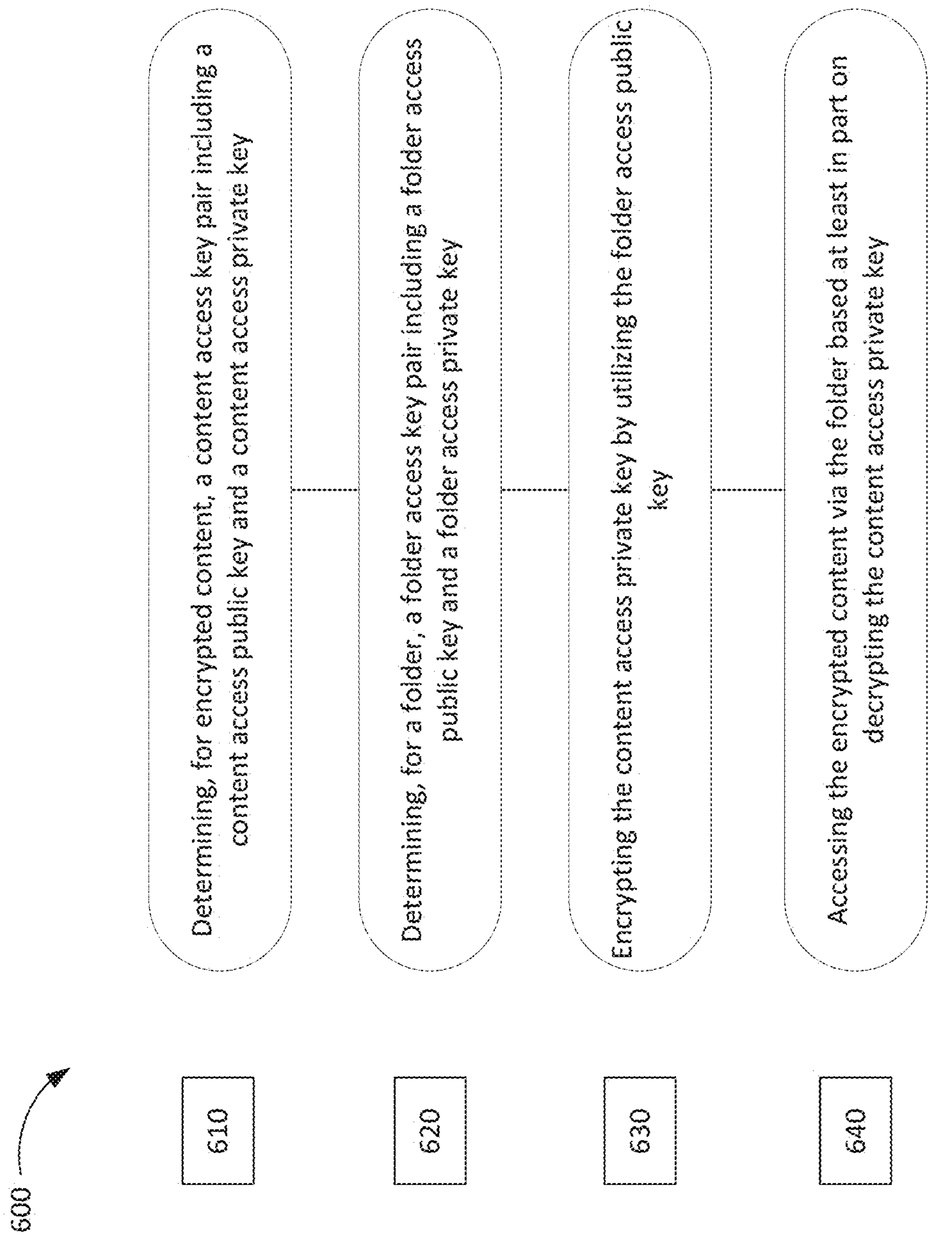

FIG. 6 is an illustration of an example process associated with providing an organized data storage system, according to various aspects of the present disclosure.

Figure 7:
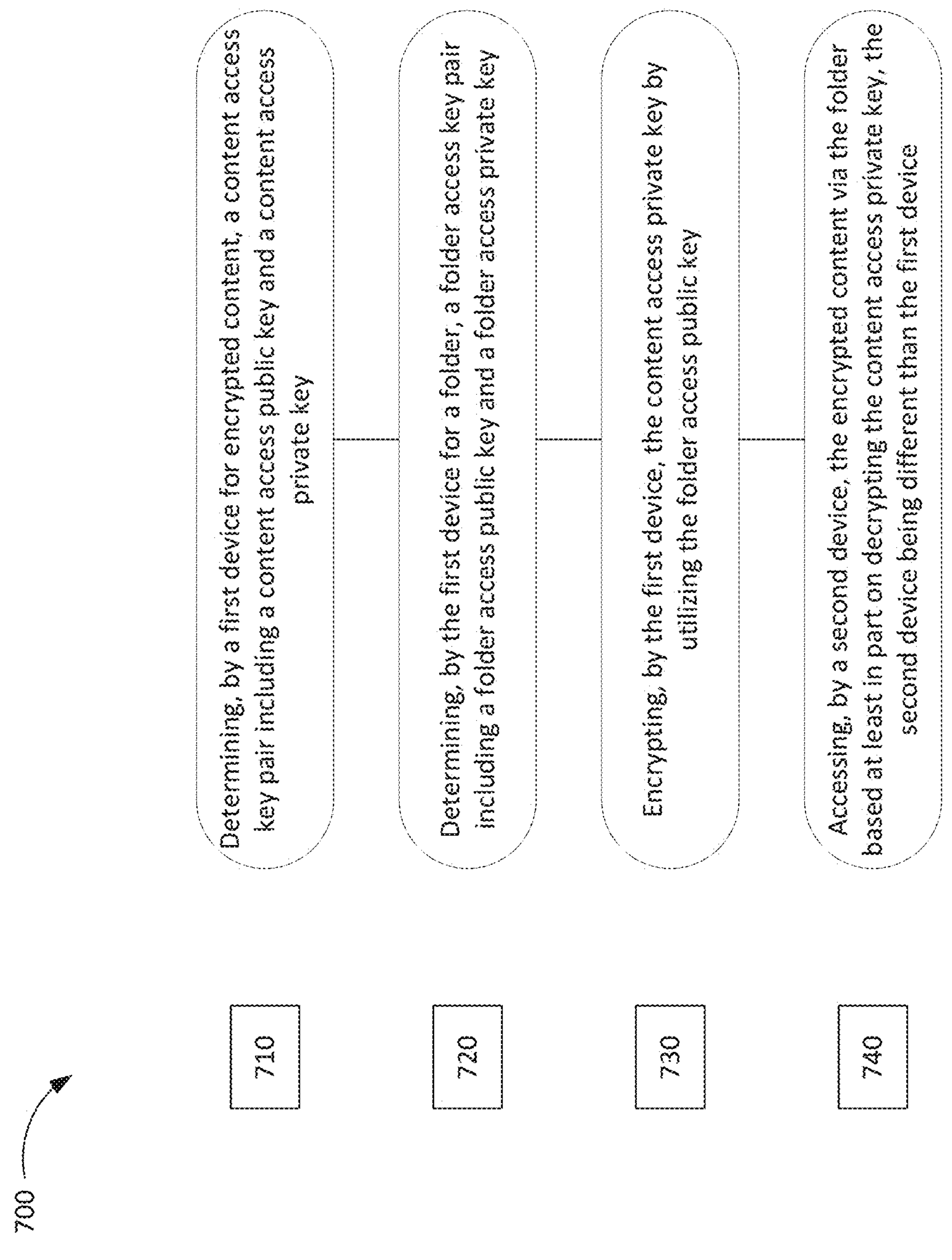

FIG. 7 is an illustration of an example process associated with providing an organized data storage system, according to various aspects of the present disclosure.

Figure 8:
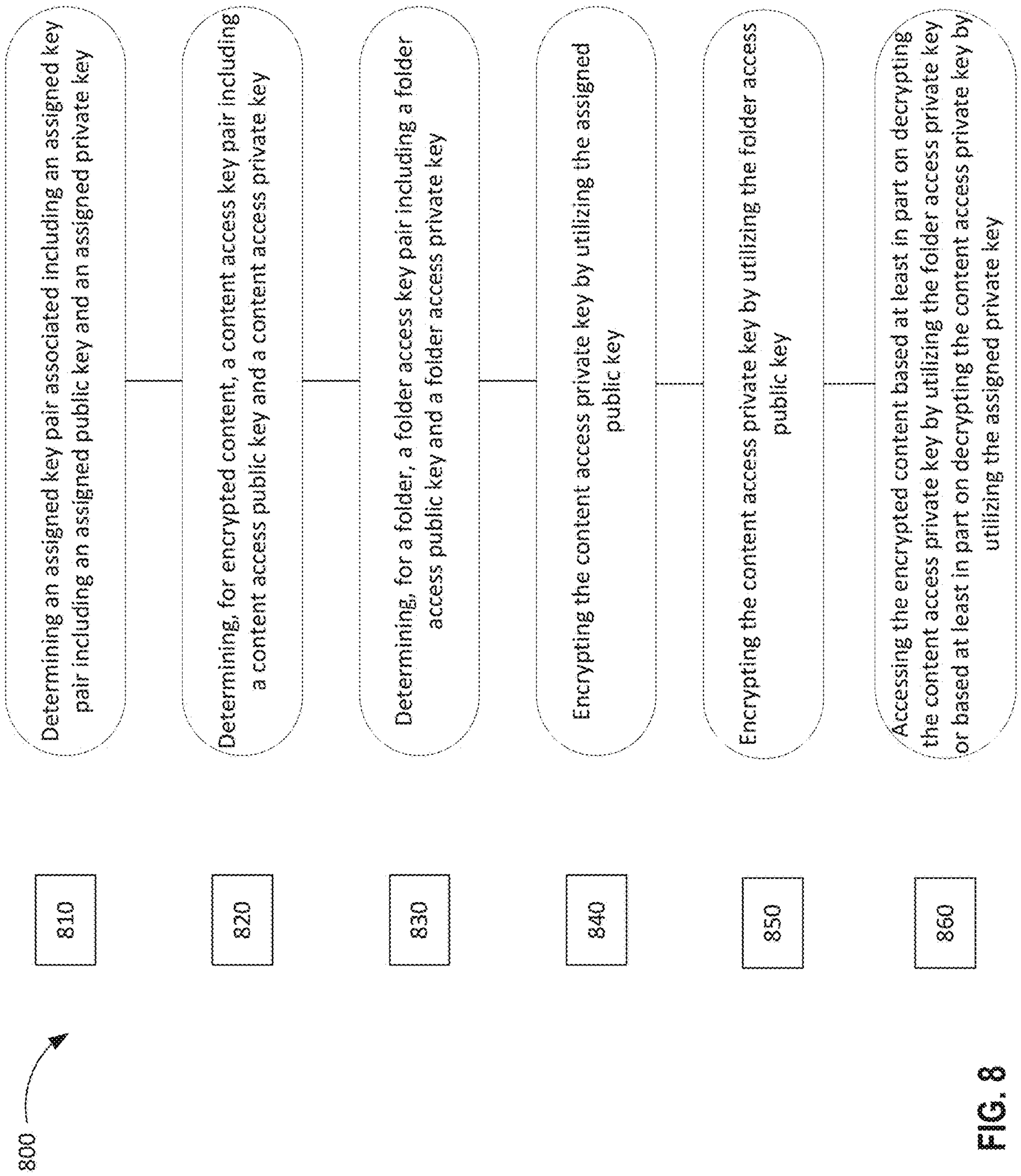

FIG. 8 is an illustration of an example process associated with providing an organized data storage system, according to various aspects of the present disclosure.

Figure 9:
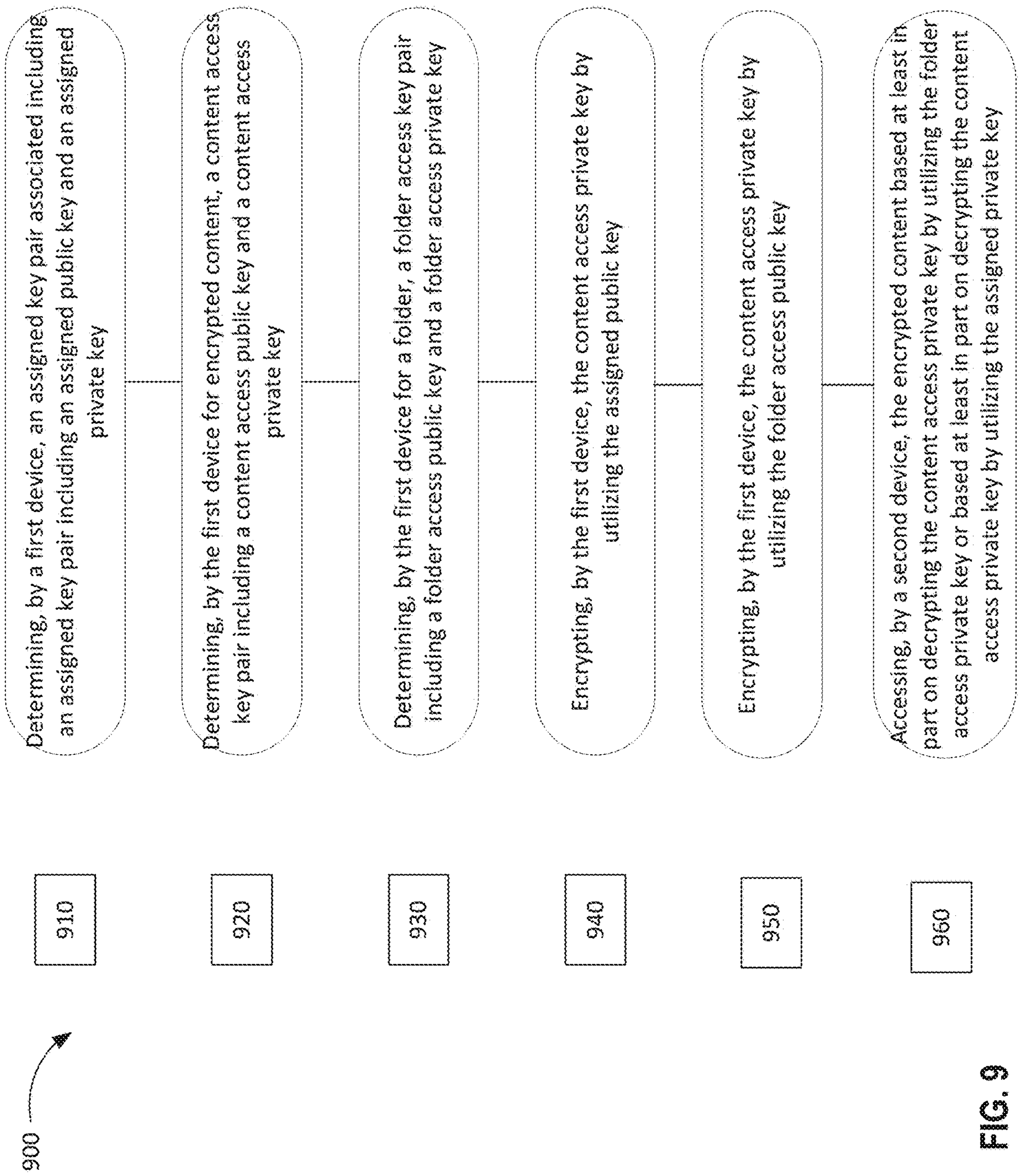

FIG. 9 is an illustration of an example process associated with providing an organized data storage system, according to various aspects of the present disclosure.

Figure 10:
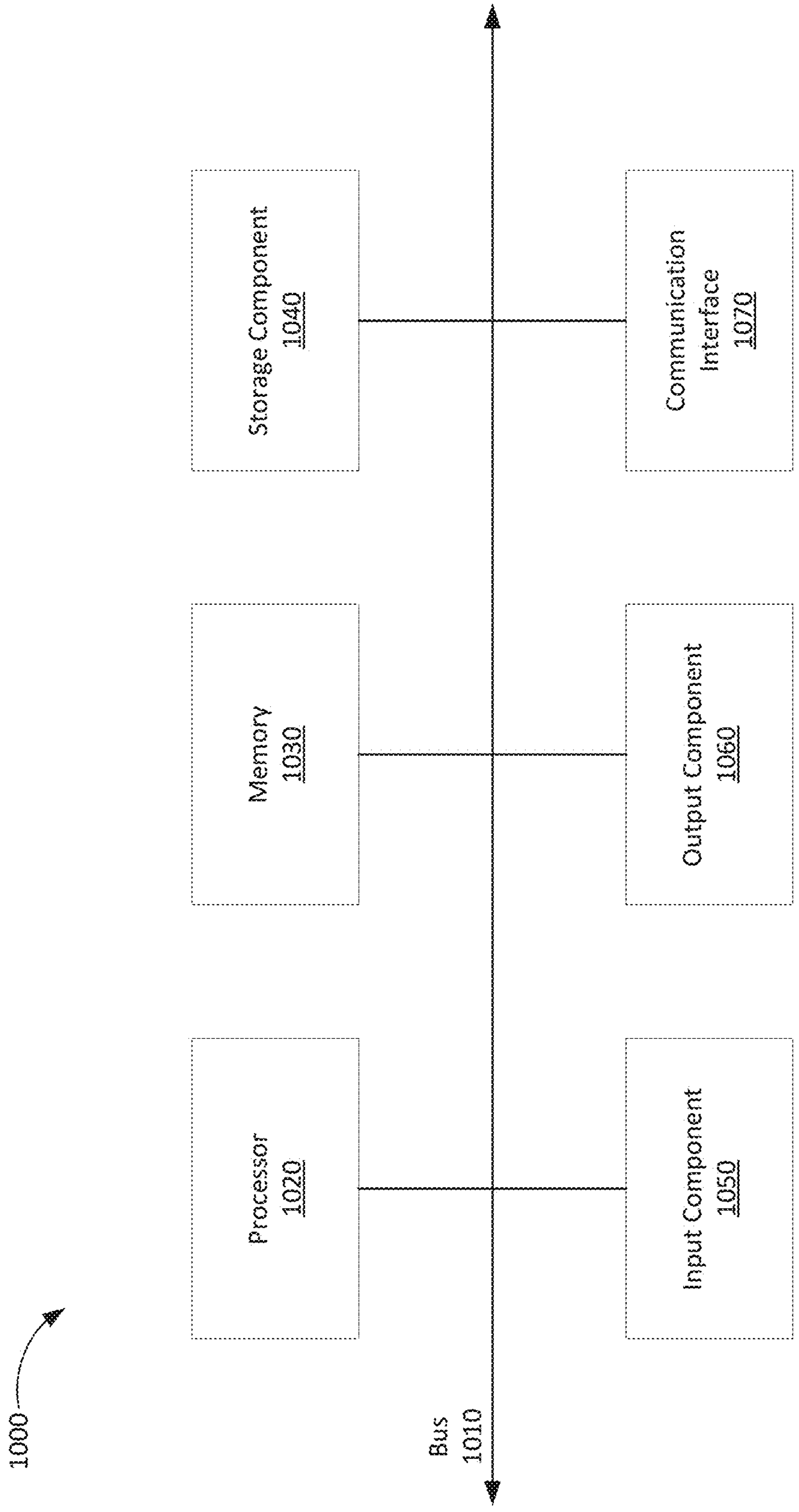

FIG. 10 is an illustration of example devices associated with providing an organized data storage system, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with providing an organized data storage system, according to various aspects of the present disclosure. The system 100 includes one or more user devices 102 communicating a stateless infrastructure 110 including a processing unit 112 and a database (e.g., memory) 114. In an example, a user device 102 may include a processing unit 106 and may utilize an installed client application 104 to communicate with an application programming interface (API) (not shown) included in the stateless infrastructure 110. In some aspects, the user device 102 and the stateless infrastructure 110 may communicate with one another over a network 120. The network 120 may be wired or wireless network. In some aspects, the network 120 may include one or more of, for example, a phone line, a local-area network (LAN), a wide-area network (WAN), a metropolitan-area network (MAN), a home-area network (HAN), Internet, Intranet, Extranet, and Internetwork. In some aspects, the network 120 may include a digital telecommunication network that permits several nodes to share and access resources.

The user device 102 may be a physical computing device capable of hosting a client application and of connecting to the network 120. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The user device 102 may include and/or may be associated with a communication interface to communicate (e.g., receive and/or transmit) data.

In some aspects, the stateless infrastructure 110 may provide the user device 102 with a client application 104 to be installed on the user device 102. The client application 104 may enable a processor (e.g., processing unit 106, processor 520) associated with the user device 102 to encrypt and decrypt the data. In some aspects, the client application 104 and/or the stateless infrastructure 110 may utilize one or more encryption and decryption algorithms to encrypt and decrypt the data. The encryption algorithms and decryption algorithms may employ standards such as, for example, data encryption standards (DES), advanced encryption standards (AES), Rivest-Shamir-Adleman (RSA) encryption standard, Open PGP standards, file encryption overview, disk encryption overview, email encryption overview, etc. Some examples of encryption algorithms include a triple data encryption standard (DES) algorithm, Rivest-Shamir-Adleman (RSA) encryption algorithm, advanced encryption standards (AES) algorithms, Twofish encryption algorithms, Blowfish encryption algorithms, IDEA encryption algorithms, MD5 encryption algorithms, HMAC encryption algorithms, etc.

In some aspects, data may include any information such as private information including, for example, bank account numbers, credit card numbers, various passwords, etc. In some aspects, the data may include electronic information included in files such as, for example, photographs, documents, compact discs (CDs), digital video disks (DVDs), etc. including written, printed, and/or electronic matter that provides information and/or evidence.

The stateless infrastructure 110 may include the processing unit 112 and the database 114. The processing unit 112 may include a logical component configured to perform complex operations to evaluate various factors associated with encrypting and decrypting the data. The database 114 may store various pieces of information associated with encrypting and decrypting the data, including encrypted content and/or encrypted key information. In some aspects, the stateless infrastructure 110 may include an application programming interface (API) (not shown) to communicate with the client application 104. The stateless infrastructure 110 may include or be associated with a communication interface to communicate (e.g., transmit and/or receive) data.

As indicated above, FIG. 1 is provided as an example. Other examples may differ from what is described with regard to FIG. 1.

A user device may request data storage services from a data storage service provider (DSSP). Such data storage services may include cloud storage services that enable the user device to utilize, for example, the Internet to store data on remote servers and/or storage devices managed by the DSSP. The data storage services may also be referred to as cloud backup services, online data storage services, online drive storages, file hosting services, file storage services, or the like. The DSSP may attempt to protect the stored data by requiring the user device to provide credentials (e.g., username, password, one-time passwords, one-time tokens, or the like) to gain authorized access to the stored data. The data storage services may be available via use of a web interface and/or an application interface.

In some instances, the DSSP may fail to protect the stored data. In an example, a third party may gain unauthorized access to the stored data by, for example, hacking into the servers and/or storage devices managed by the DSSP. In another example, internal devices associated with the DSSP that have access to the servers and/or storage devices managed by the DSSP may gain unauthorized access to the stored data. As a result, an integrity associated with the stored data may be compromised. To regain access to the stored data and/or to protect the stored data, the user device and/or the DSSP may expend resources (e.g., management resources, memory resources, computational/processing resources, power consumption resources, system bandwidth, network resources, etc.) that may otherwise be used for more suitable tasks associated with the data storage services.

Various aspects of systems and techniques discussed in the present disclosure are associated with encrypting and data. In some aspects, a DSSP may provide a stateless system including a stateless infrastructure and/or a client application installed on a user device. In some aspects, the stateless infrastructure may provide the user device with the client application. In some aspects, the client application may enable the user device to encrypt and decrypt the data that the user device may wish to protect. In an example, the client application may enable the user device to encrypt data, to store the encrypted data, and to decrypt the encrypted data. In some aspects, the user device may encrypt the data, store the encrypted data, and decrypt the encrypted data without the stateless infrastructure having access to and/or storing unencrypted data. As a result, even if a third party gains unauthorized access to the client application and/or the stateless infrastructure, the unauthorized access may lead to encrypted data, which the third party may not be able to decrypt. The client application and/or the stateless infrastructure may employ a particular arrangement of keys to encrypt and decrypt the data. Such particular arrangement of keys may be critical because it enables the client application and/or the stateless infrastructure to provide data storage services (e.g., protect stored data) without storing unencrypted data. In this way, the client application and/or the stateless infrastructure may mitigate instances of the data becoming compromised, thereby enabling efficient utilization of resources (e.g., management resources, memory resources, computational/processing resources, power consumption resources, system bandwidth, network resources, etc.) associated with the user device and/or the stateless infrastructure for more suitable tasks related to the data storage services.

Additional aspects of systems and techniques discussed herein enable the stateless system to provide the organized data storage system. In some aspects, the stateless system may provide virtual folders and may enable authorized access to the virtual folders and prevent unauthorized access to the virtual folders. In some aspects, as discussed below in further detail, the stateless system may provide one or more relationships using a particular key arrangement. Such particular key arrangement may be critical because it enables authorized access to the virtual folders and prevents unauthorized access to the virtual folders without having access to unencrypted data. In some aspects, the virtual folders may include encrypted content.

In some aspects, the stateless system (e.g., client application and/or the stateless infrastructure) may determine an assigned key pair including an assigned public key and an assigned private key; determine, for a folder including encrypted content, a folder access key pair including a folder access public key and a folder access private key; encrypt the folder access private key by utilizing the assigned public key; and access the encrypted content based at least in part on decrypting the folder access private key.

FIG. 2 is an illustration of an example flow 200 associated with providing an organized data storage system, according to various aspects of the present disclosure. The example flow 200 may include a user device 102 in communication with a stateless infrastructure 110. In some aspects, the user device 102 may install a client application 104 associated with the stateless infrastructure 110 and may use the client application 104 to communicate with an application programming interface (API) and a processor (e.g., processing unit 112, processor 1020) associated with the stateless infrastructure 110. In some aspects, the user device 102 and the stateless infrastructure may communicate over a network (e.g., network 120).

As shown by reference numeral 210, the user device 102 may register an account with the stateless infrastructure 110. In some aspects, during the registration, the user device 102 may provide registration information such as, for example, identity of an owner of the user device 102, a phone number associated with the user device 102, an email address associated with the user device 102, or the like. In some aspects, the user device 102 may set up an access system including, for example, username, password, or the like to subsequently gain access to the registered account.

In some aspects, the stateless infrastructure 110 may provide the client application 104 to be installed on the user device 102. The client application 104 may enable the user device 102 to receive information to be processed by the client application 104 and/or by the stateless infrastructure 110. The client application 104 may include a graphical interface to receive the information via a local input interface (e.g., touch screen, keyboard, mouse, pointer, etc.) associated with the user device 102. The information may be received via text input or via a selection from among a plurality of options (e.g., pull down menu, etc.). In some aspects, the client application 104 may activate and/or enable, at a time associated with the registration (e.g., after the registration), the graphical interface for receiving the information. For instance, the client application 104 may cause a screen (e.g., local screen) associated with the user device 102 to display, for example, a pop-up message to request entry of the information. Further, the client application 104 may enable transmission of at least a portion of the information to the stateless infrastructure 110.

As shown by reference numeral 220, the stateless system may determine information based at least in part on the registration of the account with the stateless infrastructure 110. In an example, the client application 104 may determine an asymmetric assigned key pair for the registered account associated with user device 102. The assigned key pair may be unique to the registered account and may include an assigned public key and an assigned private key. In this way, the assigned public key and the assigned private key may be account-specific and/or maybe associated with the registered account. In some aspects, the assigned public key and the assigned private key may be associated with each other via, for example, a mathematical function. As a result, data encrypted using the assigned public key may be decrypted by utilizing the assigned private key.

Further, the client application 104 may receive a master string of alphanumeric characters from the user device 102. In some aspects, the master string may be unique and be associated with the registered account associated with the user device 102. Based at least in part on receiving the master string, the client application 104 may determine a master key. In some aspects, the client application 104 may utilize a password derivation function and/or a key derivation function to determine the master key based at least in part on the master string. The password derivation function and/or the key derivation function may perform password hashing to determine the master key. The client application 104 may utilize the master key to encrypt the assigned private key associated with the registered account.

As shown by reference numeral 230, the client application 104 may transmit, and the stateless infrastructure 110 may receive, at least a portion of the information determined by the client application 104. For instance, the client application 104 may transmit, for example, the assigned public key and the encrypted assigned private key to the stateless infrastructure 110. The stateless infrastructure 110 may store and correlate the received information in association with the registered account associated with the user device 102. In some aspects, when another device associated with the registered account (e.g., another device owned by and/or available to the owner of the user device 102) wishes to decrypt the encrypted content, the stateless infrastructure 110 may provide such information to the other device.

In some aspects, the stateless system may provide one or more folders. In an example, the client application 104 may enable the user device 102 to associate (e.g., store) the one or more folders locally and/or remotely. In an example, the user device 102 may provide the one or more folders in association with a local memory and/or a remote memory associated with the user device 102. In another example, the user device 102 may provide the one or more folders in association with a database (e.g., database 114) associated with data storage services provided by the stateless system. In yet another example, the user device 102 may provide the one or more folders in association with a hand-held memory (e.g., a USB thumb drive, flash drive, etc.). In some aspects, the user device 102 may provide a folder based at least in part on storing, in a memory, data (e.g., information, encrypted content, etc.) within and/or in association with the folder. In some aspects, the one or more folders may include one or more virtual folders. A virtual folder may include, for example, a pointer to indicate a location of the data and/or information (e.g., a "shortcut") indicating a path to the location of the data.

For a given virtual folder, as shown by reference numeral 240, the client application 104 may determine a folder access key pair. The folder access key pair may include a folder access public key and a folder access private key. The folder access public key and the folder access private key may be associated with each other via, for example, a mathematical function. As a result, data encrypted using the folder access public key may be decrypted by utilizing the folder access private key. Further, the client application 104 may encrypt the folder access private key by utilizing the assigned public key associated with the registered account.

As shown by reference numeral 250, the client application 104 may transmit, and the stateless infrastructure 110 may receive, at least a portion of the information determined by the client application 104. For instance, the client application 104 may transmit the folder access public key and the encrypted folder access private key to the stateless infrastructure 110. In some aspects, when another device associated with the registered account (e.g., another device owned by and/or available to the owner of the user device 102) wishes to access the virtual folder, the stateless infrastructure 110 may provide such information to the other device.

When the user device 102 (or the other device associated with the registered account) may wish to access the virtual folder, the user device 102 (e.g., or the other device) may access the registered account and request the encrypted assigned private key from the stateless infrastructure 110. Based at least in part on receiving the request, as shown by reference numeral 260, the stateless infrastructure 110 may transmit, and the client application 104 may receive, the encrypted assigned private key. In some aspects, as shown by reference numeral 270, the stateless infrastructure 110 may transmit additional information such as, for example, the encrypted folder access private key, location of the virtual folder, etc. when the user device 102 and/or the other device may not have access to such additional information.

Based at least in part on receiving the encrypted assigned private key, the encrypted folder access private key, etc., the client application 104 may be enabled to access the virtual folder. In an example, the client application 104 may request entry of the master string and based at least in part on receiving the master string, the client application 104 may determine the master key that was utilized to encrypt the assigned private key. The client application 104 may utilize the master key to decrypt the assigned private key. The client application 104 may utilize the assigned private key to decrypt the encrypted folder access private key based at least in part on an association between the assigned private key and the assigned public key. Further, the client application 104 may utilize the access private key to access the virtual folder. In some aspects, the client application 104 may utilize the access private key to access encrypted content associated with and/or included within the virtual folder.

In some aspects, one or more functionalities performed by the client application 104 may be included in and/or may be performed by the stateless infrastructure 110, and vice versa.

As indicated above, FIG. 2 is provided as an example. Other examples may differ from what is described with regard to FIG. 2.

FIG. 3 is an illustration of an example flow 300 associated with providing an organized data storage system, according to various aspects of the present disclosure. The example flow 300 may include a user device 102 in communication with a stateless infrastructure 110. In some aspects, the user device 102 may install a client application 104 associated with the stateless infrastructure 110 and may use the client application 104 to communicate with an application programming interface (API) and a processor (e.g., processing unit 112, processor 520) associated with the stateless infrastructure 110. In some aspects, the user device 102 and the stateless infrastructure may communicate over a network (e.g., network 120).

In some aspects, the user device 102 may wish to encrypt data and to store the encrypted data. As discussed below with respect to FIG. 4, the user device 102 may wish to encrypt data and to store the encrypted data within and/or in association with a virtual folder. In some aspects, the client application 104 may determine respective symmetric keys and content access key pairs for each piece of data (e.g., content) that the user device 102 may wish to encrypt. In this way, the symmetric key and the content access key pair may be content-specific. Examples of content may include any information including, for example, alphanumeric data such as passwords, credit card numbers, bank account numbers, etc. and/or information that is written, printed, and/or electronically included in documents and/or files such as photographs, or processing documents, CDs, DVDs, etc.

For given content, as shown by reference numeral 310, the client application 104 may utilize a random bit generator to determine a symmetric key. In an example, the symmetric key may be a random key including a sequence of unpredictable and unbiased information. Further, the client application 104 may determine a content access key pair including a content access public key and a content access private key. The content access public key and the content access private key may be associated with each other via, for example, a mathematical function. As a result, data encrypted using the content access public key may be decrypted by utilizing the content access private key.

The client application 104 may utilize the symmetric key and the content access key pair to encrypt the content. In an example, the client application 104 may encrypt the content access private key using the assigned public key associated with the registered account (e.g., first encryption of content access private key). The client application 104 may encrypt the symmetric key by utilizing the content access public key. The client application 104 may encrypt the content by utilizing the symmetric key. In some aspects, the client application 104 may enable the user device 102 to store the encrypted content.

As shown by reference numeral 320, the client application 104 may transmit, and the stateless infrastructure 110 may receive, at least a portion of the information determined by the client application 104. For instance, the client application 104 may transmit one or more of the content access public key, the encrypted content access private key, the encrypted symmetric key, or the encrypted data to the stateless infrastructure 110. In some aspects, when another device associated with the registered account (e.g., another device owned by and/or available to the owner of the user device 102) wishes to decrypt the encrypted content, the stateless infrastructure 110 may provide such information to the other device.

When the user device 102 (or the other device associated with the registered account) may wish to decrypt the encrypted content, the user device 102 (e.g., or the other device) may access the registered account and request the encrypted assigned private key (discussed with respect to FIG. 2). Based at least in part on receiving the request, as shown by reference numeral 330, the stateless infrastructure 110 may transmit, and the client application 104 may receive, the encrypted assigned private key. In some aspects, as shown by reference numeral 340, when the user device 102 and/or the other device may not have access to the encrypted content, the stateless infrastructure 110 may also transmit the first encrypted content access private key, the encrypted symmetric key, and the encrypted content to the user device 102 and/or the other device.

Based at least in part on receiving the encrypted assigned private key, the encrypted content access private key, the encrypted symmetric key, and/or the encrypted content, the client application 104 may be enabled to decrypt the content. For instance, the client application 104 may request entry of the master string and based at least in part on receiving the master string, the client application 104 may determine the master key that was utilized to encrypt the assigned private key (discussed above with respect to FIG. 2). The client application 104 may utilize the master key to decrypt the assigned private key. The client application 104 may utilize the assigned private key to decrypt the encrypted content access private key based at least in part on an association between the assigned private key and the assigned public key. Further, the client application 104 may utilize the content access private key to decrypt the symmetric key based at least in part on an association between the access private key and the access public key. As shown by reference numeral 350, the client application 104 may utilize the symmetric key to decrypt the content. In this way, the user device 102 (and/or the other device) may directly access the content.

In some aspects, one or more functionalities performed by the client application 104 may be included in and/or may be performed by the stateless infrastructure 110, and vice versa.

As indicated above, FIG. 3 is provided as an example. Other examples may differ from what is described with regard to FIG. 3.

FIG. 4 is an illustration of an example flow 400 associated with providing an organized data storage system, according to various aspects of the present disclosure. The example flow 400 may include a user device 102 in communication with a stateless infrastructure 110. In some aspects, the user device 102 may install a client application 104 associated with the stateless infrastructure 110 and may use the client application 104 to communicate with an application programming interface (API) and a processor (e.g., processing unit 112, processor 520) associated with the stateless infrastructure 110. In some aspects, the user device 102 and the stateless infrastructure may communicate over a network (e.g., network 120).

In some aspects, the user device 102 may wish to store encrypted content within and/or in association with a virtual folder. In this case, the stateless system may enable provision of a relationship between the encrypted content and the virtual folder. In some aspects, the relationship may utilize a particular key arrangement. Such particular key arrangement may be critical because, without having access to unencrypted data, the stateless system enables authorized access to the encrypted content via the virtual folder and prevents unauthorized access to the encrypted content via the folder.

To provide the relationship between given encrypted content and the virtual folder, as shown by reference numeral 410, the client application 104 may again encrypt the content access private key associated with the encrypted content by utilizing the folder access public key associated with the virtual folder (e.g., second encryption of content access private key).

As shown by reference numeral 420, the client application 104 may transmit the second encrypted content access private key to the stateless infrastructure 110. In some aspects, when another device associated with the registered account (e.g., another device owned by and/or available to the owner of the user device 102) wishes to decrypt the encrypted content via access to the virtual folder, the stateless infrastructure 110 may provide such information to the other device.

When the user device 102 (or the other device associated with the registered account) may wish to decrypt the encrypted content via access to the virtual folder, the user device 102 (e.g., or the other device) may access the registered account and request the encrypted assigned private key (discussed with respect to FIG. 2). Based at least in part on receiving the request, as shown by reference numeral 430, the stateless infrastructure 110 may transmit, and the client application 104 may receive, the encrypted assigned private key. In some aspects, as shown by reference numeral 440, when the user device 102 and/or the other device may not have access to the encrypted content, the stateless infrastructure 110 may also transmit the second encrypted content access private key, the encrypted symmetric key, and the encrypted content to the user device 102 and/or the other device.

Based at least in part on receiving the encrypted assigned private key, the second encrypted content access private key, the encrypted symmetric key, and/or the encrypted content, the client application 104 may be enabled to decrypt the content via access to the virtual folder. For instance, the client application 104 may request entry of the master string and based at least in part on receiving the master string, the client application 104 may determine the master key that was utilized to encrypt the assigned private key (discussed above with respect to FIG. 2). The client application 104 may utilize the master key to decrypt the assigned private key. The client application 104 may utilize the assigned private key to decrypt the folder access private key associated with the virtual folder to access the virtual folder. In some aspects, the client application 104 may decrypt the folder access private key based at least in part on an association between the assigned private key and the assigned public key. The client application 104 may utilize the folder access private key to decrypt the second encrypted content access private key associated with the content. In some aspects, the client application 104 may decrypt the content access private key based at least in part on an association between the folder access private key and the folder access public key. Further, the client application 104 may utilize the content access private key to decrypt the symmetric key. In some aspects, the client application 104 may decrypt the symmetric key based at least in part on an association between the content access private key and the content access public key. As shown by reference numeral 450, the client application 104 may utilize the symmetric key to decrypt the content. In this way, the user device 102 (and/or the other device) may access the content via access to the virtual folder.

In some aspects, one or more functionalities performed by the client application 104 may be included in and/or may be performed by the stateless infrastructure 110, and vice versa.

As indicated above, FIG. 4 is provided as an example. Other examples may differ from what is described with regard to FIG. 4.

FIG. 5 is an illustration of an example process 500 associated with providing an organized data storage system, according to various aspects of the present disclosure. In some aspects, the process 500 may be performed by a memory and/or a processor/controller (e.g., processor 106, processor 1020) associated with a user device (e.g., user device 102) executing a client application and/or by a memory and a processor/controller (e.g., processing unit 112, processor 1020) associated with a stateless infrastructure (e.g., stateless infrastructure 110). As shown by reference numeral 510, process 500 may include determining, by a device, an assigned key pair including an assigned public key and an assigned private key. For instance, the user device and/or the stateless infrastructure may utilize the associated processor/controller to determine an assigned key pair including an assigned public key and an assigned private key, as discussed elsewhere herein.

As shown by reference numeral 520, process 500 may include determining, by the device for a folder including encrypted content, a folder access key pair including a folder access public key and a folder access private key. For instance, the user device and/or the stateless infrastructure may utilize the associated processor/controller to determine, for a folder including encrypted content, a folder access key pair including a folder access public key and a folder access private key, as discussed elsewhere herein.

As shown by reference numeral 530, process 500 may include encrypting, by the device, the folder access private key by utilizing the assigned public key. For instance, the user device and/or the stateless infrastructure may utilize the associated processor/controller to encrypt the folder access private key by utilizing the assigned public key, as discussed elsewhere herein.

As shown by reference numeral 540, process 500 may include accessing, by the device, the encrypted content based at least in part on decrypting the folder access private key. For instance, the user device and/or the stateless infrastructure may utilize the associated processor/controller to access the encrypted content based at least in part on decrypting the folder access private key, as discussed elsewhere herein.

Process 500 may include additional aspects, such as any single aspect or any combination of aspects described below and/or in connection with one or more other processes described elsewhere herein.

In a first aspect, process 500 may include determining a master key based at least in part on the master string of alphanumeric characters; and encrypting the assigned private key by utilizing the master key.

In a second aspect, alone or in combination with the first aspect, process 500 may include determining a master key based at least in part on the master string of alphanumeric characters; and decrypting the assigned private key by utilizing the master key.

In a third aspect, alone or in combination with the first through second aspects, process 500 may include decrypting the assigned private key, encrypted by utilizing a master key; and decrypting the folder access private key by utilizing the assigned private key.

In a fourth aspect, alone or in combination with the first through third aspects, in process 500, the folder access public key and the folder access private key are specific to the folder.

In a fifth aspect, alone or in combination with the first through fourth aspects, in process 500, the assigned public key and the assigned private key are specific to a registered account associated with the device.

In a sixth aspect, alone or in combination with the first through fifth aspects, in process 500, the folder is a virtual folder.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with providing an organized data storage system, according to various aspects of the present disclosure. In some aspects, the process 600 may be performed by a memory and/or a processor/controller (e.g., processor 106, processor 1020) associated with a user device (e.g., user device 102) executing a client application and/or by a memory and a processor/controller (e.g., processing unit 112, processor 1020) associated with a stateless infrastructure (e.g., stateless infrastructure 110). As shown by reference numeral 610, process 600 may include determining, by a device for encrypted content, a content access key pair including a content access public key and a content access private key. For instance, the user device and/or the stateless infrastructure may utilize the associated memory and processor to determine, for encrypted content, a content access key pair including a content access public key and a content access private key, as discussed elsewhere herein.

As shown by reference numeral 620, process 600 may include determining, by the device for a folder, a folder access key pair including a folder access public key and a folder access private key. For instance, the user device and/or the stateless infrastructure may utilize the associated memory and processor to determine, for a folder, a folder access key pair including a folder access public key and a folder access private key, as discussed elsewhere herein.

As shown by reference numeral 630, process 600 may include encrypting, by the device, the content access private key by utilizing the folder access public key. For instance, the user device and/or the stateless infrastructure may utilize the associated memory and processor to encrypt, the content access private key by utilizing the folder access public key, as discussed elsewhere herein.

As shown by reference numeral 640, process 600 may include accessing, by the device, the encrypted content via the folder based at least in part on decrypting the content access private key. For instance, the user device and/or the stateless infrastructure may utilize the associated memory and processor to access, by the device, the encrypted content via the folder based at least in part on decrypting the content access private key, as discussed elsewhere herein.

Process 600 may include additional aspects, such as any single aspect or any combination of aspects described below and/or in connection with one or more other processes described elsewhere herein.

In a first aspect, process 600 may include decrypting the content access private key by utilizing the folder access private key.

In a second aspect, alone or in combination with the first aspect, process 600 may include determining an assigned key pair associated with the device, the assigned key pair including an assigned public key and an assigned private key; and encrypting the folder access private key by utilizing the assigned public key.

In a third aspect, alone or in combination with the first through second aspects, process 600 may include determining an assigned key pair associated with the device, the assigned key pair including an assigned public key and an assigned private key; and decrypting the folder access private key by utilizing the assigned private key.

In a fourth aspect, alone or in combination with the first through third aspects, process 600 may include determining a master key based at least in part on a master string of alphanumeric characters; encrypting an assigned private key associated with the device by utilizing the master key; and encrypting the folder access private key by utilizing an assigned public key associated with the device.

In a fifth aspect, alone or in combination with the first through fourth aspects, process 600 may include determining a master key based at least in part on a master string of alphanumeric characters; decrypting an assigned private key associated with the device by utilizing the master key; and decrypting the folder access private key by utilizing the assigned private key.

In a sixth aspect, alone or in combination with the first through fifth aspects, in process 600, the folder is a virtual folder.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of an example process 700 associated with providing an organized data storage system, according to various aspects of the present disclosure. In some aspects, the process 700 may be performed by respective memories and/or respective processors/controllers (e.g., processor 106, processor 1020) associated with one or more user devices (e.g., user device 102) executing respective client applications and/or by a memory and/or a processor/controller (e.g., processing unit 112, processor 1020) associated with a stateless infrastructure (e.g., stateless infrastructure 110). As shown by reference numeral 710, process 700 may include determining, by a first device for encrypted content, a content access key pair including a content access public key and a content access private key. For instance, a first user device may utilize the associated processor/controller to determine, for encrypted content, a content access key pair including a content access public key and a content access private key, as discussed elsewhere herein.

As shown by reference numeral 720, process 700 may include determining, by the first device for a folder, a folder access key pair including a folder access public key and a folder access private key. For instance, the first user device may utilize the associated processor/controller to determine, for a folder, a folder access key pair including a folder access public key and a folder access private key, as discussed elsewhere herein.

As shown by reference numeral 730, process 700 may include encrypting, by the first device, the content access private key by utilizing the folder access public key. For instance, the first user device may utilize the associated processor/controller to encrypt the content access private key by utilizing the folder access public key, as discussed elsewhere herein.

As shown by reference numeral 740, process 700 may include accessing, by a second device, the encrypted content via the folder based at least in part on decrypting the content access private key, the second device being different than the first device. For instance, a second user device may utilize the associated processor/controller to access the encrypted content via the folder based at least in part on decrypting the content access private key, the second device being different than the first device, as discussed elsewhere herein.

Process 700 may include additional aspects, such as any single aspect or any combination of aspects described below and/or in connection with one or more other processes described elsewhere herein.

In a first aspect, process 700 may include decrypting, by the second device, the content access private key by utilizing the folder access private key.

In a second aspect, alone or in combination with the first aspect, process 700 may include determining, by the first device, an assigned key pair associated with the device, the assigned key pair including an assigned public key and an assigned private key; and encrypting, by the first device, the folder access private key by utilizing the assigned public key.

In a third aspect, alone or in combination with the first through second aspects, process 700 may include determining, by the second device, an assigned key pair associated with the device, the assigned key pair including an assigned public key and an assigned private key; and decrypting, by the second device, the folder access private key by utilizing the assigned private key.

In a fourth aspect, alone or in combination with the first through third aspects, process 700 may include determining, by the first device, a master key based at least in part on a master string of alphanumeric characters; encrypting, by the first device, an assigned private key associated with the device by utilizing the master key; and encrypting, by the first device, the folder access private key by utilizing an assigned public key associated with the device.

In a fifth aspect, alone or in combination with the first through fourth aspects, process 700 may include determining, by the second device, a master key based at least in part on a master string of alphanumeric characters; decrypting, by the second device, an assigned private key associated with the device by utilizing the master key; and decrypting, by the second device, the folder access private key by utilizing the assigned private key.

In a sixth aspect, alone or in combination with the first through fifth aspects, in process 700, the folder is a virtual folder.

Although FIG. 7 shows example blocks of the process, in some aspects, the process may include additional blocks, fewer blocks, different blocks, or differently arranged blocks than those depicted in FIG. 7. Additionally, or alternatively, two or more of the blocks of the process may be performed in parallel.

As indicated above, FIG. 7 is provided as an example. Other examples may differ from what is described with regard to FIG. 7.

FIG. 8 is an illustration of an example process 800 associated with providing an organized data storage system, according to various aspects of the present disclosure. In some aspects, the process 800 may be performed by a memory and/or a processor/controller (e.g., processor 106, processor 1020) associated with a user device (e.g., user device 102) executing a client application and/or by a memory and a processor/controller (e.g., processing unit 112, processor 1020) associated with a stateless infrastructure (e.g., stateless infrastructure 110). As shown by reference numeral 810, process 800 may include determining, by a device, an assigned key pair associated including an assigned key pair including an assigned public key and an assigned private key. For instance, the user device and/or the stateless infrastructure may utilize the associated memory and processor to determine an assigned key pair associated including an assigned key pair including an assigned public key and an assigned private key, as discussed elsewhere herein.

As shown by reference numeral 820, process 800 may include determining, by the device for encrypted content, a content access key pair including a content access public key and a content access private key. For instance, the user device and/or the stateless infrastructure may utilize the associated memory and processor to determine, for encrypted content, a content access key pair including a content access public key and a content access private key, as discussed elsewhere herein.

As shown by reference numeral 830, process 800 may include determining, by the device for a folder, a folder access key pair including a folder access public key and a folder access private key. For instance, the user device and/or the stateless infrastructure may utilize the associated memory and processor to determine, for a folder, a folder access key pair including a folder access public key and a folder access private key, as discussed elsewhere herein.

As shown by reference numeral 840, process 800 may include encrypting, by the device, the content access private key by utilizing the assigned public key. For instance, the user device and/or the stateless infrastructure may utilize the associated memory and processor to encrypt the content access private key by utilizing the assigned public key, as discussed elsewhere herein.

As shown by reference numeral 850, process 800 may include encrypting, by the device, the content access private key by utilizing the folder access public key. For instance, the user device and/or the stateless infrastructure may utilize the associated memory and processor to encrypt the content access private key by utilizing the folder access public key, as discussed elsewhere herein.

As shown by reference numeral 860, process 800 may include accessing, by the device, the encrypted content based at least in part on decrypting the content access private key by utilizing the folder access private key or based at least in part on decrypting the content access private key by utilizing the assigned private key. For instance, the user device and/or the stateless infrastructure may utilize the associated memory and processor to access the encrypted content based at least in part on decrypting the content access private key by utilizing the folder access private key or based at least in part on decrypting the content access private key by utilizing the assigned private key, as discussed elsewhere herein.

Process 800 may include additional aspects, such as any single aspect or any combination of aspects described below and/or in connection with one or more other processes described elsewhere herein.

In a first aspect, process 800 may include encrypting the folder access private key by utilizing the assigned public key.

In a second aspect, alone or in combination with the first aspect, process 800 may include decrypting the folder access private key by utilizing the assigned private key.

In a third aspect, alone or in combination with the first through second aspects, process 800 may include determining a master key based at least in part on a master string of alphanumeric characters; encrypting the assigned private key by utilizing the master key; and encrypting the folder access private key by utilizing the assigned public key.

In a fourth aspect, alone or in combination with the first through third aspects, process 800 may include determining a master key based at least in part on a master string of alphanumeric characters; decrypting the assigned private key by utilizing the master key; and decrypting the folder access private key by utilizing the assigned private key.

In a fifth aspect, alone or in combination with the first through fourth aspects, process 800 may include determining a master key based at least in part on a master string of alphanumeric characters; encrypting a randomly generated key by utilizing the master key; and encrypting content by utilizing the randomly generated key to provide the encrypted content.

In a sixth aspect, alone or in combination with the first through fifth aspects, in process 800, the folder is a virtual folder.

Although FIG. 8 shows example blocks of the process, in some aspects, the process may include additional blocks, fewer blocks, different blocks, or differently arranged blocks than those depicted in FIG. 8. Additionally, or alternatively, two or more of the blocks of the process may be performed in parallel.

As indicated above, FIG. 8 is provided as an example. Other examples may differ from what is described with regard to FIG. 8.

FIG. 9 is an illustration of an example process 900 associated with providing an organized data storage system, according to various aspects of the present disclosure. In some aspects, the process 900 may be performed by respective memories and/or respective processors/controllers (e.g., processor 106, processor 1020) associated with one or more user devices (e.g., user device 102) executing respective client applications and/or by a memory and/or a processor/controller (e.g., processing unit 112, processor 1020) associated with a stateless infrastructure (e.g., stateless infrastructure 110). As shown by reference numeral 910, process 900 may include determining, by a first device, an assigned key pair associated including an assigned key pair including an assigned public key and an assigned private key. For instance, a first user device may utilize the associated processor/controller to determine an assigned key pair associated including an assigned key pair including an assigned public key and an assigned private key, as discussed elsewhere herein.

As shown by reference numeral 920, process 900 may include determining, by the first device for encrypted content, a content access key pair including a content access public key and a content access private key. For instance, the first user device may utilize the associated processor/controller to determine, for encrypted content, a content access key pair including a content access public key and a content access private key, as discussed elsewhere herein.

As shown by reference numeral 930, process 900 may include determining, by the first device for a folder, a folder access key pair including a folder access public key and a folder access private key. For instance, the first user device may utilize the associated processor/controller to determine, for a folder, a folder access key pair including a folder access public key and a folder access private key, as discussed elsewhere herein.

As shown by reference numeral 940, process 900 may include encrypting, by the first device, the content access private key by utilizing the assigned public key. For instance, the first user device may utilize the associated processor/controller to encrypt the content access private key by utilizing the folder access public key, as discussed elsewhere herein.

As shown by reference numeral 950, process 900 may include encrypting, by the first device, the content access private key by utilizing the folder access public key. For instance, the first user device may utilize the associated processor/controller to encrypt the content access private key by utilizing the assigned public key, as discussed elsewhere herein.

As shown by reference numeral 960, process 900 may include accessing, by a second device, the encrypted content based at least in part on decrypting the content access private key by utilizing the folder access private key or based at least in part on decrypting the content access private key by utilizing the assigned private key. For instance, a second user device may utilize the associated processor/controller to access the encrypted content based at least in part on decrypting the content access private key by utilizing the folder access private key or based at least in part on decrypting the content access private key by utilizing the assigned private key, as discussed elsewhere herein.

Process 900 may include additional aspects, such as any single aspect or any combination of aspects described below and/or in connection with one or more other processes described elsewhere herein.

In a first aspect, process 900 may include encrypting, by the first device, the folder access private key by utilizing the assigned public key.

In a second aspect, alone or in combination with the first aspect, process 900 may include decrypting, by the second device, the folder access private key by utilizing the assigned private key.

In a third aspect, alone or in combination with the first through second aspects, process 900 may include determining, by the first device, a master key based at least in part on a master string of alphanumeric characters; encrypting, by the first device, the assigned private key by utilizing the master key; and encrypting, by the first device, the folder access private key by utilizing the assigned public key.

In a fourth aspect, alone or in combination with the first through third aspects, process 900 may include determining, by the second device, a master key based at least in part on a master string of alphanumeric characters; decrypting, by the second device, the assigned private key by utilizing the master key; and decrypting, by the second device, the folder access private key by utilizing the assigned private key.

In a fifth aspect, alone or in combination with the first through fourth aspects, process 900 may include determining, by the first device, a master key based at least in part on a master string of alphanumeric characters; encrypting, by the first device, a randomly generated key by utilizing the master key; and encrypting content by utilizing the randomly generated key to provide the encrypted content.

In a sixth aspect, alone or in combination with the first through fifth aspects, in process 900, the folder is a virtual folder.

Although FIG. 9 shows example blocks of the process, in some aspects, the process may include additional blocks, fewer blocks, different blocks, or differently arranged blocks than those depicted in FIG. 9. Additionally, or alternatively, two or more of the blocks of the process may be performed in parallel.

As indicated above, FIG. 9 is provided as an example. Other examples may differ from what is described with regard to FIG. 9.

FIG. 10 is an illustration of example devices 1000 associated with providing an organized data storage system, according to various aspects of the present disclosure. In some aspects, the example devices 1000 may form part of or implement the systems, environments, infrastructures, components, or the like described elsewhere herein (e.g., FIGS. 1-4) and may be used to perform the example processes described elsewhere herein. The example devices 1000 may include a universal bus 1010 communicatively coupling a processor 1020, a memory 1030, a storage component 1040, an input component 1050, an output component 1060, and a communication interface 1070.

Bus 1010 may include a component that permits communication among multiple components of a device 1000. Processor 1020 may be implemented in hardware, firmware, and/or a combination of hardware and software. Processor 1020 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 1020 may include one or more processors capable of being programmed to perform a function. Memory 1030 may include a random access memory (RAM), a read only memory (ROM), and/or another type of dynamic or static storage device (e.g., a flash memory, a magnetic memory, and/or an optical memory) that stores information and/or instructions for use by processor 1020.

Storage component 1040 may store information and/or software related to the operation and use of a device 1000. For example, storage component 1040 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 1050 may include a component that permits a device 1000 to receive information, such as via user input (e.g., a touch screen display, a keyboard, a keypad, a mouse, a button, a switch, and/or a microphone). Additionally, or alternatively, input component 1050 may include a component for determining location (e.g., a global positioning system (GPS) component) and/or a sensor (e.g., an accelerometer, a gyroscope, an actuator, another type of positional or environmental sensor, and/or the like). Output component 1060 may include a component that provides output information from device 1000 (via, for example, a display, a speaker, a haptic feedback component, an audio or visual indicator, and/or the like).

Communication interface 1070 may include a transceiver-like component (e.g., a transceiver, a separate receiver, a separate transmitter, and/or the like) that enables a device 1000 to communicate with other devices, such as via a wired connection, a wireless connection, or a combination of wired and wireless connections. Communication interface 1070 may permit device 1000 to receive information from another device and/or provide information to another device. For example, communication interface 1070 may include an Ethernet interface, an optical interface, a coaxial interface, an infrared interface, a radio frequency (RF) interface, a universal serial bus (USB) interface, a Wi-Fi interface, a cellular network interface, and/or the like.

A device 1000 may perform one or more processes described elsewhere herein. A device 1000 may perform these processes based on processor 1020 executing software instructions stored by a non-transitory computer-readable medium, such as memory 1030 and/or storage component 1040. As used herein, the term "computer-readable medium" may refer to a non-transitory memory device. A memory device may include memory space within a single physical storage device or memory space spread across multiple physical storage devices.

Software instructions may be read into memory 1030 and/or storage component 1040 from another computer-readable medium or from another device via communication interface 1070. When executed, software instructions stored in memory 1030 and/or storage component 1040 may cause processor 1020 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 10 are provided as an example. In practice, a device 1000 may include additional components, fewer components, different components, or differently arranged components than those shown in FIG. 10. Additionally, or alternatively, a set of components (e.g., one or more components) of a device 1000 may perform one or more functions described as being performed by another set of components of a device 1000.

As indicated above, FIG. 10 is provided as an example. Other examples may differ from what is described with regard to FIG. 10.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "of" is intended to be inclusive when used in a series and may be used interchangeably with "and/or," unless explicitly stated otherwise (e.g., if used in combination with "either" or "only one of").

What is claimed is:

1. A method, comprising:

configuring a user device to determine an assigned key pair including an assigned public key and an assigned private key;

configuring the user device to determine, for encrypted content, a content access key pair including a content access public key and a content access private key;

configuring the user device to determine, for a folder, a folder access key pair including a folder access public key and a folder access private key;

configuring the user device to encrypt the content access private key by utilizing the assigned public key to determine a first encrypted content access private key;

configuring the user device to encrypt the content access private key by utilizing the folder access public key to determine a second encrypted content access private key;

configuring the user device to transmit the encrypted content, the first encrypted content access private key, and the second encrypted content access private key to a server for storage; and configuring the user device to access, from the server, the encrypted content based at least in part on the user device decrypting the first encrypted content access private key by utilizing the assigned private key or based at least in part on the user device decrypting the second encrypted content access private key by utilizing the folder access private key.

2. The method of claim 1, further comprising:

configuring the user device to encrypt the folder access private key by utilizing the assigned public key to determine an encrypted folder access private key.

3. The method of claim 1, further comprising:

configuring the user device to decrypt an encrypted folder access private key by utilizing the assigned private key.

4. The method of claim 1, further comprising:

configuring the user device to determine a master key based at least in part on a master string of alphanumeric characters;

configuring the user device to encrypt the assigned private key by utilizing the master key to determine an encrypted assigned private key; and configuring the user device to encrypt the folder access private key by utilizing the assigned public key to determine an encrypted folder access private key.

5. The method of claim 1, further comprising:

configuring the user device to determine a master key based at least in part on a master string of alphanumeric characters;

configuring the user device to decrypt an encrypted assigned private key by utilizing the master key; and configuring the user device to decrypt an encrypted folder access private key by utilizing the assigned private key.

6. The method of claim 1, further comprising:

configuring the user device to determine a master key based at least in part on a master string of alphanumeric characters;

configuring the user device to encrypt content by utilizing a randomly generated key to determine the encrypted content; and configuring the user device to encrypt the randomly generated key by utilizing the master key to determine an encrypted randomly generated key.

7. The method of claim 1, wherein the folder is a virtual folder.

8. An infrastructure device, comprising:

a memory; and a processor communicatively coupled to the memory, the memory and the processor being configured to:

configure a user device to determine an assigned key pair including an assigned key pair including an assigned public key and an assigned private key;

configure the user device to determine, for encrypted content, a content access key pair including a content access public key and a content access private key;

configure the user device to determine, for a folder, a folder access key pair including a folder access public key and a folder access private key;

configure the user device to encrypt the content access private key by utilizing the assigned public key to determine a first encrypted content access private key;

configure the user device to encrypt the content access private key by utilizing the folder access public key to determine a second encrypted content access private key;

configure the user device to transmit the encrypted content, the first encrypted content access private key, and the second encrypted content access private key to a server for storage; and configure the user device to access, from the storage, the encrypted content based at least in part on the user device decrypting the first encrypted content access private key by utilizing the assigned private key or based at least in part on the user device decrypting the second encrypted content access private key by utilizing the folder access private key.

9. The infrastructure device of claim 8, wherein the memory and the processor are configured to:

configure the user device to encrypt the folder access private key by utilizing the assigned public key to determine an encrypted folder access private key.

10. The infrastructure device of claim 8, wherein the memory and the processor are configured to:

configure the user device to decrypt an encrypted folder access private key by utilizing the assigned private key.

11. The infrastructure device of claim 8, wherein the memory and the processor are configured to:

configure the user device to determine a master key based at least in part on a master string of alphanumeric characters;

configure the user device to encrypt the assigned private key by utilizing the master key to determine an encrypted assigned private key; and configure the user device to encrypt the folder access private key by utilizing the assigned public key to determine an encrypted folder access private key.

12. The infrastructure device of claim 8, wherein the memory and the processor are configured to:

configure the user device to determine a master key based at least in part on a master string of alphanumeric characters;

configure the user device to decrypt an encrypted assigned private key by utilizing the master key; and configure the user device to decrypt an encrypted folder access private key by utilizing the assigned private key.

13. The infrastructure device of claim 8, wherein the memory and the processor are configured to:

configure the user device to determine a master key based at least in part on a master string of alphanumeric characters;

configure the user device to encrypt content by utilizing a randomly generated key to determine the encrypted content; and configure the user device to encrypt the randomly generated key by utilizing the master key to determine an encrypted randomly generated key.

14. The infrastructure device of claim 8, wherein the folder is a virtual folder.

15. A non-transitory computer-readable medium configured to store instructions, which when executed by a processor associated with an infrastructure device, configure the processor to:

configure a user device to determine an assigned key pair including an assigned key pair including an assigned public key and an assigned private key;

configure the user device to determine, for encrypted content, a content access key pair including a content access public key and a content access private key;

configure the user device to determine, for a folder, a folder access key pair including a folder access public key and a folder access private key;

configure the user device to encrypt the content access private key by utilizing the assigned public key to determine a first encrypted content access private key;

configure the user device to encrypt the content access private key by utilizing the folder access public key to determine a second encrypted content access private key;

configure the user device to transmit the encrypted content, the first encrypted content access private key, and the second encrypted content access private key to a server for storage; and configure the user device to access, from the storage, the encrypted content based at least in part on the user device decrypting the first encrypted content access private key by utilizing the assigned private key or based at least in part on the user device decrypting the second encrypted content access private key by utilizing the folder access private key.

16. The non-transitory computer-readable medium of claim 15, wherein the processor is configured to:

configure the user device to encrypt the folder access private key by utilizing the assigned public key to determine an encrypted folder access private key.

17. The non-transitory computer-readable medium of claim 15, wherein the processor is configured to:

configure the user device to decrypt an encrypted folder access private key by utilizing the assigned private key.

18. The non-transitory computer-readable medium of claim 15, wherein the processor is configured to:

configure the user device to determine a master key based at least in part on a master string of alphanumeric characters;

configure the user device to encrypt the assigned private key by utilizing the master key to determine an encrypted assigned private key; and configure the user device to encrypt the folder access private key by utilizing the assigned public key to determine an encrypted folder access private key.

19. The non-transitory computer-readable medium of claim 15, wherein the processor is configured to:

configure the user device to determine a master key based at least in part on a master string of alphanumeric characters;

configure the user device to decrypt an encrypted assigned private key by utilizing the master key; and configure the user device to decrypt an encrypted folder access private key by utilizing the assigned private key.

20. The non-transitory computer-readable medium of claim 15, wherein the processor is configured to:

configure the user device to determine a master key based at least in part on a master string of alphanumeric characters;

configure the user device to encrypt content by utilizing a randomly generated key to determine the encrypted content; and configure the user device to encrypt the randomly generated key by utilizing the master key to determine an encrypted randomly generated key.

* * * * *